Patented May 12, 1942

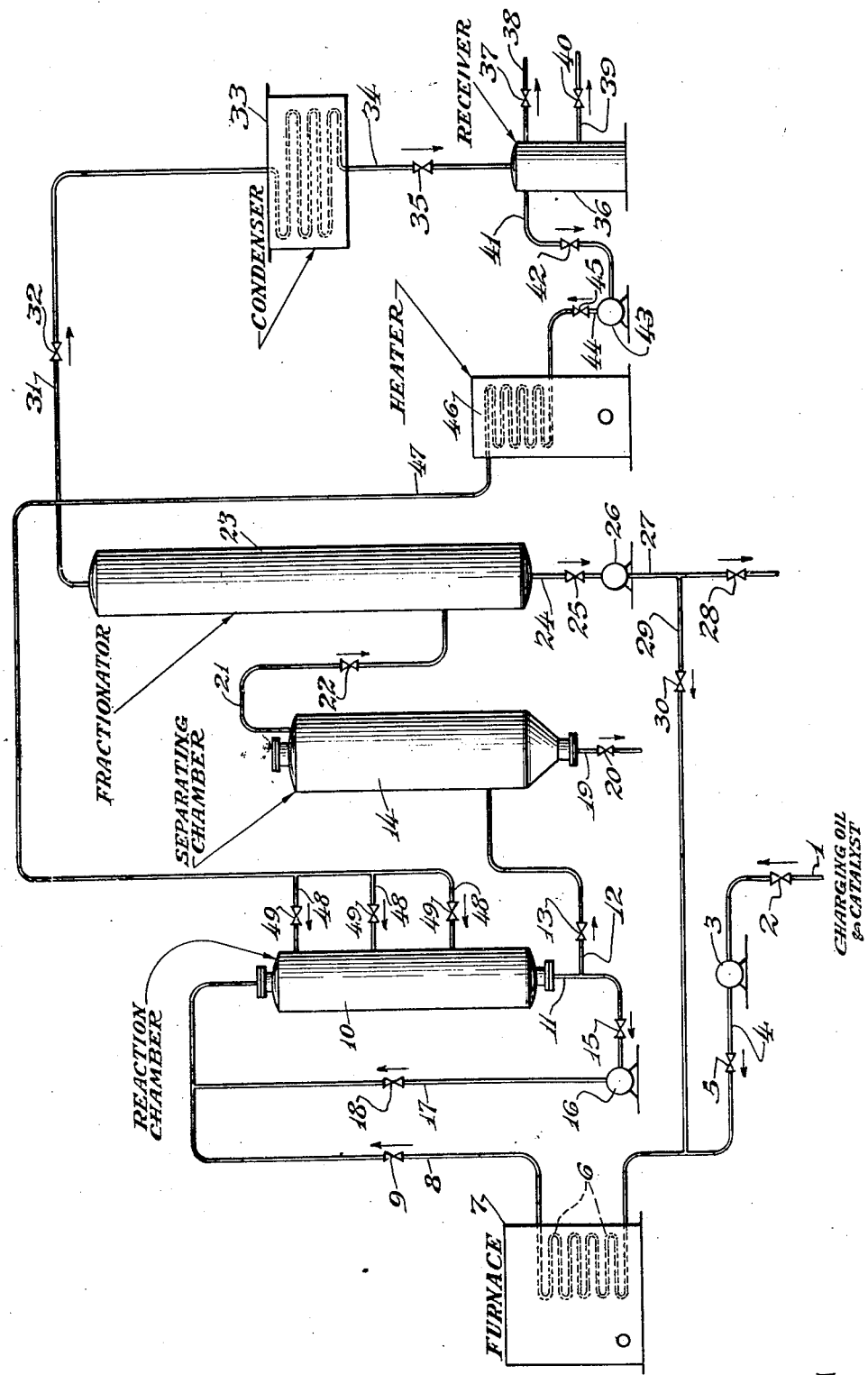

2,282,855

UNITED STATES PATENT OFFICE 2,282,855

CATALYTIC CONVERSION OF HYDROCARBON OILS

Gustav Egloff, Chicago, Ill., assignor to Universal Oil Products Company, Chicago, Ill., a corporation of Delaware Application June 29, 1940, Serial No. 343,198

5 Claims. (Cl. 196—52)

The invention is particularly concerned with an improved process for the catalytic cracking of hydrocarbon oils.

The process is of the general type in which a catalytically active solid material, capable of promoting the cracking reaction and in finely divided or powdered form, is dispersed within the oil to be cracked and the dispersion passed through a heating coil and succeeding reaction zone wherein the catalytic cracking reaction takes place, the resulting products passing from the reaction zone to subsequent residue separating, fractionating, condensing and collecting steps and the process being operated for the production of high yields of good antiknock gasoline.

In the improved process of the present invention, provision is made for establishing a cyclic flow of conversion products and catalyst through the reaction zone. This is accomplished by removing the mixture of conversion products and catalyst from the outlet end of the reaction zone, supplying a portion of this mixture to the subsequent residue separating step and continuously returning another portion thereof to or adjacent the inlet end of the reaction zone.

This improvement results in more complete utilization of the catalyst which, I have found, still retains considerable catalytic activity after it has passed once or several times through the reaction zone. Also, due to the recycling of regulated quantities of the catalyst-containing conversion products, I am able to employ a smaller reaction zone for the same degree of conversion as would be obtained with a correspondingly larger reaction zone wherein the heated hydrocarbons and catalyst from the coil are passed only once therethrough or, with a reaction zone of equal size, I am able to obtain a higher degree of conversion, as compared with an otherwise similar operation in which catalyst-containing conversion products are not recycled.

The invention further provides for reheating normally gaseous products of the process and returning the same to the reaction zone wherein they commingle with the heated hydrocarbons and catalyst from the heating coil and with the recycled conversion products and catalyst. This feature serves, among other purposes, as a method of maintaining the desired cracking temperature in the reaction zone without external heating thereof and is particularly advantageous in combination with the cyclic flow of catalyst containing conversion products through the reaction zone, since the latter, without the last named feature, would result in a considerable reduction in the temperature which would otherwise normally prevail in the reaction zone.

The improved yields and octane number of the gasoline produced, which may be obtained by employing the features of the invention, may be due, in part, to some beneficial reaction between the hot recycled gases and other reactants or conversion products present in the reaction zone and/or to polymerization or alkylation or both of components of the recirculated gas stream in the reaction zone, since the normally gaseous products produced in this type of catalytic cracking operation normally contain substantial quantities of relatively high-boiling olefins as well as corresponding paraffines. However, I do not offer this as a conclusive or complete explanation of the beneficial results obtained by employing the improvements provided by the invention, since the various conversion reactions which will take place in such a system are difficult to predict or identify.

The accompanying drawing diagrammatically illustrates one specific form of apparatus embodying the features of the invention and in which the improved process may be conducted.

Referring to the drawing, the charging oil, which will be any oil amenable to catalytic cracking and in which the desired quantity of powdered catalyst has been suspended or thoroughly dispersed by any well known means, not illustrated, is supplied through line 1 and valve 2 to pump 3 and is fed therefrom through line 4 and valve 5 to heating coil 6 disposed in furnace 7. The oil and catalyst are heated in passing through coil 6 to a temperature at which the desired catalytic cracking reaction will take place and the heated material is directed from coil 6 through line 8 and valve 9 into reaction zone 10.

The reaction zone, in the particular case here illustrated, comprises a vertically disposed enlarged reaction chamber, to the upper portion of which the heated oil and catalyst from coil 6 are supplied and passed downwardly therethrough, the resulting conversion products being removed, still in commingled state, from the lower end of chamber 10 through line 11. A regulated portion of the resulting conversion products and catalyst withdrawn from the lower portion of chamber 10 is directed through line 12 and valve 13 to separating chamber 14 and the remainder is supplied through valve 15 in line 11 to pump 16 which may, for example, be a centrifugal pump capable of keeping the catalyst particles in suspension or dispersion in the conversion products and wherefrom the stream of conversion products and commingled catalyst is returned through line 17 and valve 18 to the upper portion of chamber 10, thus setting up a local cycle of this material within the reaction chamber.

The function of separating chamber 14 is to separate the conversion products supplied thereto into a stream of relatively clean vapors and a residual liquid fraction containing substantially all of the catalyst particles in the stream of conversion products supplied to this zone. The catalyst-containing residual liquid is removed from the lower portion of chamber 14 through line 19 and valve 20, preferably to suitable settling or filtering equipment, not illustrated, for separation of the catalyst particles from the oil, following which the catalyst particles may be reactivated for further use in any conventional manner, such as, for example, by burning the deleterious deposits therefrom in a stream of oxygen-containing gases.

The vaporous conversion products are directed from the upper portion of chamber 14 through line 21 and valve 22 to fractionator 23 from the upper portion of which a fractionated vaporous stream of the desired end-boiling point is removed. Higher boiling fractions of the vaporous conversion products supplied to fractionator 23 are condensed in this zone as reflux condensate and, in the particular case here illustrated, the total reflux condensate so formed is directed from the lower portion of the fractionator through line 24 and valve 25 to pump 26 wherefrom it may be supplied through line 27 and valve 28 to cooling and storage or to thermal cracking treatment or elsewhere, as desired. Preferably, however, all, a portion of the total or selected fractions of the reflux condensate formed in fractionator 23 are returned to heating coil 6 for further cracking treatment in this zone and in the subsequent reaction chamber.

Provision is made, in the case here illustrated, for supplying regulated quantities of the reflux condensate removed from the lower portion of the fractionator from line 27 through line 29, valve 30 and line 4 back to heating coil 6.

The fractionated vaporous stream removed from the upper portion of fractionator 23, preferably consisting essentially of gasoline of the desired end-boiling point and normally gaseous conversion products of the process, is directed through line 31 and valve 32 to condensation in condenser 33 wherefrom the resulting distillate and uncondensed gases are directed through line 34 and valve 35 to collection and separation in receiver 36. Uncondensed gases are released from the receiver through line 37 and valve 38 to storage or elsewhere, as desired, and distillate collected in the receiver is directed therefrom through line 39 and valve 40 to storage or to any desired further treatment.

When desired, regulated quantities of the distillate collected in receiver 36 may be returned therefrom by well known means, not illustrated, to the upper portion of fractionator 23 to serve as a cooling and refluxing medium in this zone.

As a special feature of the invention, regulated quantities of the normally gaseous conversion products collected in receiver 36 are reheated and returned to the reaction chamber. To accomplish thus, gases are removed from receiver 36 through line 41 and supplied through valve 42 in this line to compressor 43 and thence fed through line 44 and valve 45 to heater 46, wherein they are heated in any desired manner to or somewhat above the temperature which it is desired to maintain in the reaction chamber. The stream of heated gases is directed from heater 46 through line 47 and supplied therefrom through one or more of the branch lines 48 having valves 49 disposed therein into reaction chamber 10 at one or a plurality of spaced points in this zone, wherein they commingle with and supply heat to the reactants and conversion products passing therethrough.

The invention is not concerned with the specific type of catalyst employed for promoting the cracking reaction so long as it is in sufficiently finely divided or powdered form to remain suspended or dispersed in the oil undergoing treatment and in the conversion products recycled to the reaction zone. One such catalyst comprises a substantially impalpable powder consisting essentially of silica and one or more metal oxides, such as alumina, zirconia, titania and thoria, the powder being obtained by precipitation of one or more of the active ingredients from a solution. No novelty is claimed herein for this particular catalyst nor for its method of preparation and, as previously mentioned, any known cracking catalyst capable of accomplishing the desired results may be employed within the scope of the invention.

The amount of catalyst employed in relation to the quantity of oil treated will depend upon the nature of the oil, the specific composition and activity of the catalyst and the fineness of subdivision of the catalyst particles. When cracking paraffinic distillates or gas-oil, for example, with the precipitated silica-alumina catalyst powder, from 0.25 to 10% or more, by weight, of catalyst, based on the oil subjected to cracking treatment, has been found to give good results and, due to the provisions for maintaining substantially uniform temperatures in the reaction chamber and for recycling catalyst and conversion products therethrough, smaller amounts of catalytic material may be employed in the improved process herein provided as compared with conventional catalytic cracking operations of this general type employing the same charging stock and under otherwise similar conditions, except for those resulting from the use of the features of the invention.

The temperature employed at the outlet of the heating coil may range, for example, from 850 to 1050° F., depending upon the nature of the charging oil and catalyst employed. Temperatures of from 900° F., upward will ordinarily be utilized for relatively light oils and when intermediate liquid conversion products of the process (reflux condensate) are returned to the heating coil.

A temperature substantially the same or somewhat lower than that employed at the outlet of the heating coil is preferably maintained in the reaction chamber.

The separating chamber is preferably operated at sufficiently low temperature to preclude detrimental further conversion in this zone of the products supplied thereto, this being ordinarily accomplished by cooling of the stream of conversion products passing from the reaction chamber to the separating chamber and/or by cooling within the separating chamber, such cooling being accomplished in any conventional manner, not illustrated.

Preferably, the heating coil and reaction chamber are operated at a superatmospheric pressure which may range, for example, from 30 to 100 pounds, or thereabouts, per square inch, and substantially the same or reduced pressure may be employed in the succeeding fractionating, condensing and collecting equipment.

As an example of one specific operation of the process, as it may be accomplished in an apparatus such as illustrated and above described, the charging stock is a Pennsylvania gas-oil of approximately 35° A. P. I. gravity which is supplied to the heating coil, together with the total reflux condensate from the fractionator and a quantity of finely powdered silica-alumina catalyst amounting to approximately 2% by weight of the combined feed (raw oil plus reflux condensate) the temperature employed at the outlet of the heating coil is approximately 980° F., and a substantially uniform temperature of approximately 950° F., is maintained in the reaction chamber by the introduction thereto, at spaced points in this zone, of normally gaseous products of the process which are heated prior to their introduction into the reaction chamber to a temperature of approximately 1000° F. Conversion products and catalyst are recycled through the reaction chamber at the rate of approximately twice the volume of this material supplied to the separating chamber. A substantially uniform superatmospheric pressure of approximately 50 pounds per square inch is employed throughout the system.

In an operation such as above described, I may obtain per barrel of gas-oil charging stock supplied to the system approximately 60% of 400° F., end-point gasoline having an octane number of approximately 73 as determined by the motor method or approximately 83 as determined by the research method. The additional products of the process consist essentially of normally gaseous fractions and residual liquid.

I claim as my invention:

1. A process for the conversion of hydrocarbon oil, which comprises heating a flowing stream of the oil to be cracked to a catalytic cracking temperature while maintaining a dispersion of finely divided catalyst particles in said stream, supplying the resulting heated oil and dispersed catalyst to one end of an elongated reaction zone, removing resulting conversion products and catalyst in commingled state from the opposite end of the reaction zone, returning a portion of the resulting conversion products and catalyst to the reaction zone, separating from the remaining portion cracked vapors and a catalyst containing residue, fractionating the vapors to form a reflux condensate, subjecting the fractionated vapors to condensation to form distillate and uncondensed gases, recovering the distillate, and reheating and returning regulated quantities of said uncondensed gases to the reaction zone at a temperature regulated to maintain an active cracking temperature therein.

2. A process for the conversion of hydrocarbon oil, which comprises introducing a continuous stream of said oil, heated to cracking temperature, together with a finely divided catalyst to one end of an elongated reaction zone and therein effecting cracking of the oil, withdrawing a continuous stream of conversion products and catalyst from the opposite end of said reaction zone, returning a portion of the last named stream to the reaction zone along with the first named stream and separating cracked vapors and catalyst containing residue from the remaining portion.

3. A process for the conversion of hydrocarbon oil, which comprises heating a flowing stream of said oil, having dispersed therein finely divided catalyst particles, to a cracking temperature, introducing the resulting heated oil and dispersed catalyst as a continuous stream to one end of an elongated reaction zone and therein effecting cracking of the oil, withdrawing a continuous stream of conversion products and catalyst from the opposite end of said reaction zone, returning a portion of the last named stream to the reaction zone along with the heated oil, and separating cracked vapors and catalyst containing residue from the remaining portion.

4. A process for the conversion of hydrocarbon oil, which comprises heating a flowing stream of said oil, having dispersed therein finely divided catalyst particles, to a cracking temperature, introducing the resulting heated oil and dispersed catalyst as a continuous stream to one end of an elongated reaction zone and therein effecting cracking of the oil, withdrawing a continuous stream of conversion products and catalyst from the opposite end of said reaction zone, returning a portion of the last named stream to the reaction zone along with the heated oil, separating cracked vapors and catalyst containing residue from the remaining portion, fractionating said vapors to form reflux condensate, recovering the fractionated vapors, and supplying said reflux condensate to the heating step along with said hydrocarbon oil.

5. The process of claim 1 further characterized in that the reheated gases are supplied to the reaction zone at spaced points intermediate the ends thereof.

GUSTAV EGLOFF.

DISCLAIMER 2,282,855.—*Gustav Egloff*, Chicago, Ill. CATALYTIC CONVERSION OF HYDROCARBON OILS. Patent dated May 12, 1942. Disclaimer filed October 23, 1943, by the assignee, *Universal Oil Products Company*.

Hereby enters this disclaimer to claims 2, 3, and 4 of said patent.

[*Official Gazette November 23, 1943.*]